Jan. 13, 1970 W. T. WARREN ET AL 3,490,056

ELECTROMECHANICAL RESONATOR FOR INTEGRATED CIRCUITS

Filed May 16, 1967 3 Sheets-Sheet 1

Inventors:
William T. Warren,
Robert T. Milton,
by Donald R. Campbell
Their Attorney.

Inventors:
William T. Warren,
Robert T. Milton,
by Donald R. Campbell
Their Attorney.

Inventors:
William T. Warren,
Robert T. Milton,
by Donald R. Campbell
Their Attorney.

United States Patent Office 3,490,056
Patented Jan. 13, 1970

3,490,056
ELECTROMECHANICAL RESONATOR FOR INTEGRATED CIRCUITS

William T. Warren, Schenectady, and Robert T. Milton, Burnt Hills, N.Y., assignors to General Electric Company, a corporation of New York Filed May 16, 1967, Ser. No. 638,953
Int. Cl. H03h 9/26
U.S. Cl. 333—72 10 Claims

ABSTRACT OF THE DISCLOSURE

A planar electromechanical resonator or filter suitable for integrated circuit fabrication comprises the combination of a cross-shaped torsional resonator driven by being attached to the central node of a flexural bar clamped at both ends and operated in even mode, and having input and output piezoelectric transducers mounted on the flexural bar. Two torsional sections can be attached to either side of the central node, and multi-sectioned resonators whose pass band characteristics can be varied include alternating torsional sections and coupler flexural bars. A single frequency resonator is formed of two parallel clamped bars operated in different modes at the same resonant frequency and coupled mechanically or electrically at one node to discriminate against unwanted resonances.

This invention relates to electromechanical resonators, and more particularly to resonators capable of miniaturization and suitable for fabrication by integrated circuit technology. Although having other applications, such resonators are commonly used as electromechanical filters selective to a single frequency or which have desired pass band characteristics.

There is considerable difficulty in manufacturing L-C resonators in inegrated circuit technology because inductors having the high inductance values needed at low frequencies cannot at present be built in integrated circuit form, and therefore other types of resonators must be considered. Electrical R-C filters in feedback loops and various mechanical or electromechanical resonators such as disk-resonator filters and cantilever-beam filters have been suggested. While some of these resonators perform well, either their complex mechanical configuration or some other electrical, mechanical, or process problem has precluded their wide use in integrated circuit technology. To be suitable for economical fabrication as an integrated circuit, the physical configuration of a mechanical resonator must be simple and preferably planar so that it can be easily miniaturized and manufactured on a substrate. Moreover, it is desirable that the input and output transducers for exciting motion of the miniaturized mechanical resonator and deriving the output be capable of being manufactured by compatible integrated circuit techniques.

Accordingly, an object of the invention is to provide a generally improved and more satisfactory electromechanical or mechanical resonator useful for a variety of purposes.

Another object is the provision of a new and improved electromechanical resonator having a physical configuration that can be readily miniaturized and which can be economically mass produced using integrated circuit techniques.

Yet another object of the invention is to provide a new and improved integrated circuit electromechanical filter whose pass band characteristics can be varied during manufacture to meet different requirements.

In accordance with the invention, an electromechanical resonator suitable to be fabricated by integrated circuit technology includes at least a first flexural member and a second resonant member, both of which are substantially planar and mounted in a common plane. The first flexural member comprises a flexural bar operated in even mode so as to have at least one node at a substantially fixed point along its length. The second resonant member is operated at a single resonant frequency, and both ends of the first flexural member and an end portion of the second resonant member are clamped so that other portions of these members are free for vibratory motion. Means are provided for coupling the second resonant member to the aforementioned node of the first flexural member to be driven thereby. Input transducer means are provided for driving the coupled members to have vibratory motion, and also output transducer means for sensing the resultant motion and deriving an output signal indicative thereof.

In the preferred embodiments, the flexural bar is operated in an even mode and has a node at the center, and the second resonant member is a torsional resonator comprising a spring bar having a pair of mass sections each extending transverse to opposite sides thereof, while one end of the spring bar is attached to the flexural bar at the central node to be driven torsionally by the bar.

In other embodiments, the resonator comprises two clamped flexural bars operated in different modes at the same resonant frequency, the bars being coupled mechanically or electrically at one node or antinode to discriminate against unwanted resonant frequencies.

The foregoing and other objects, features, and advantages of the invention will be apparent from the following more particular description of the several preferred embodiments of the invention, as illustrated in the accompanying drawings wherein:

FIGS. 1*a* and 1*b* are plan and edge views, respectively, of a flexural bar operated by an electromechanical transducer system to produce a node at the center of the bar, the dotted line standing wave pattern in FIG. 1*b* being produced when the bar is operated at a higher even mode than that which results in the solid line standing wave pattern;

FIGS. 2*a* and 2*b* are plan and edge views, respectively, of a planar cross-shaped torsional resonator, showing in FIG. 2*b* different phases of the vibration of the transverse mass sections;

Figure 6:
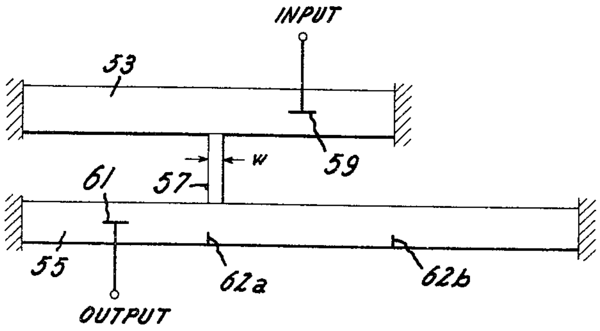
FIG. 6 is a plan view of another embodiment of the invention showing a single frequency resonator formed of two coupled clamped flexural bars operated in different modes.
Figure 7:
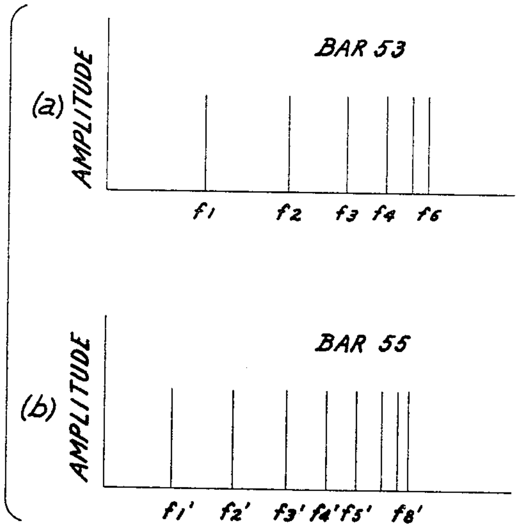
Figure 8:
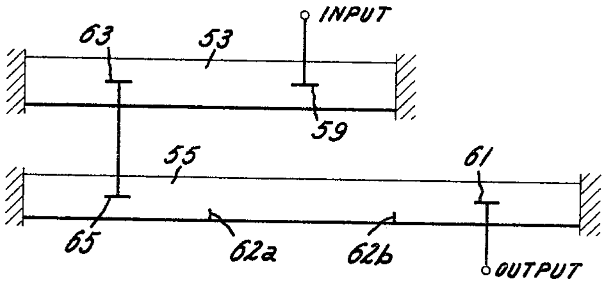

FIGS. 7*a* and 7*b* are graphs of amplitude of vibration versus frequency for the two individual clamped bars shown in FIG. 6; and FIG. 8 is a plan view similar to FIG. 6 showing a modification of the coupling between the two clamped bars.

Figure 1:
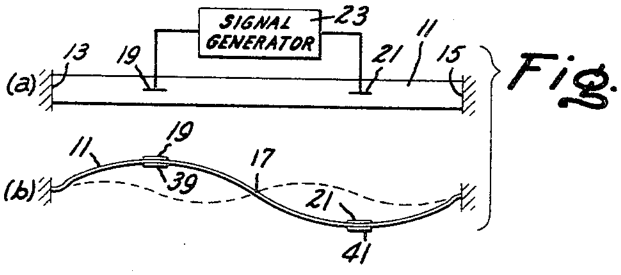

In FIGS. 1*a* and 1*b* is shown a first flexural member in the form of a planar flexural bar 11 which has an elongated rectangular shape and relatively small thickness so as to be flexible. The two ends 13 and 15 of the flexural bar 11 are clamped to a suitable support while the remaining portions of the bar are free to have vibratory motion. The bar 11 is operated in even flexural mode so as to have a node at the center of the bar. This is shown in FIG. 1*b* where the bar 11 is operated in an even mode, substantially the mode $m=2$, and produces a standing wave pattern having two loops and a central node 17. The drive system for causing the bar 11 to have vibratory motion is provided by two input electromechanical transducers 19 and 21, here shown diagrammatically, which for instance may be piezoelectric transducers coupled or attached to the top of the bar 11 at the loops or antinodes. The input transducers 19 and 21 are driven 180° out of phase by a suitable signal generator 23. The dotted line curve in FIG 1*b* shows the bar when driven in substantially the mode $m=4$, thereby producing a standing wave pattern having four loops and three nodes including the central node 17. At any even mode, there is always a node at the center of the bar 11. The bar 11 may be operated at an even mode resonant frequency, which produces a node at the center, or can be driven out of phase as shown at non-resonant frequencies so as to produce a node at the center.

Figure 2:
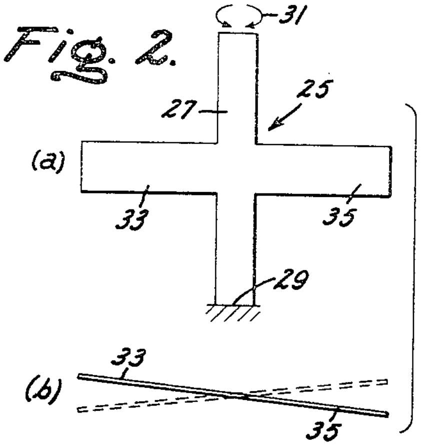

The second resonant member shown in FIGS. 2*a* and 2*b* is a planar torsional resonator 25 which has a single resonant frequency dependent upon its physical characteristics. The torsional resonator 25 has generally the shape of the Greek cross and is preferably symmetrical. It comprises an elongated rectangular spring member or bar 27 having a relatively small thickness which is clamped at the one end 29 and is free at the other end to be torsionally excited as indicated by the arrows 31. Extending transversely to each side of the spring bar 27 are a pair of mass sections 33 and 35, shown here as being rectangular in shape. Upon actuating the free end of the spring bar 27 torsionally in see-saw fashion when viewed in cross section, the mass sections 33 and 35 vibrate in a plane as shown in FIG. 2*b* in a corresponding see-saw fashion. The resonant frequency of the torsional resonator can be selected according to the formula:

$$f=\frac{1}{2\pi}\sqrt{\frac{K}{I}}$$

where K is the effective spring constant of the spring sections and I is the moment of inertia of the mass sections or cross sections 33 and 35. It will be noted that an analogy is made to a mechanical oscillatory system comprising a spring from one end of which is suspended a mass while the other end is fixed to a support.

Figure 3:
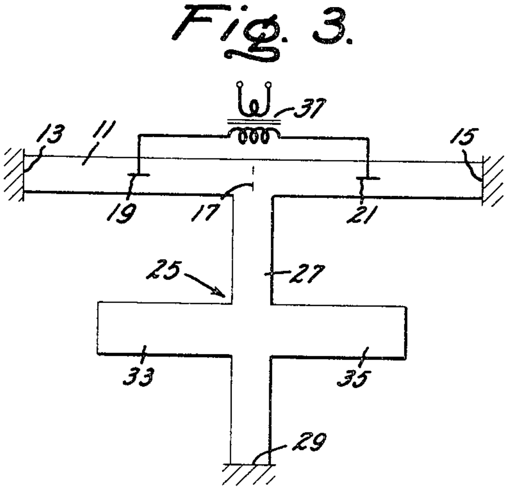
FIG. 3 is a plan view of a resonator according to the invention which comprises the combination of the flexural bar of FIG. 1*a* which drives the torsional resonator of FIG. 2*a*.

The electromechanical resonator according to the invention in its basic form comprises the combination of the torsional resonator section 25 driven by the flexural bar 11 operated in even flexural mode so as to have a node at the center. Referring to FIG. 3, the torsional resonator 25 and the flexural bar 11 are both planar and are mounted substantially coplanar with respect to one another with the spring bar 27 of the torsional resonator extending perpendicular to the flexural bar 11 and fixed or attached to one side of bar 11 approximately symmetrical with the central node 17 (here shown as a dashed line). The two input transducers 19 and 21 at the antinodes of the bar 11 are driven out of phase by being connected respectively to either end of the secondary winding of a transformer 37 whose primary winding is connected to a source of alternating current having the proper frequency. A pair of output transducers 39 and 41 (see FIG. 1*b*) are attached to the underside of the flexural bar 11 at the antinodes for sensing the resulting motion of the resonant members 11 and 25 and deriving an output signal indicative thereof. It is see that when the resonator is driven with a frequency substantially equal to the single resonant frequency of the resonator, the amplitude of the output signal is substantial, and that only a small output signal or no output signal is produced when the resonator is driven at frequencies other than its resonant frequency.

The single resonant frequency for the resonator of FIG. 3 can be selected during manufacture by properly choosing the physical characteristics of the two component members 11 and 25. In accordance with the well known formula to be given, the lowest resonant frequency $f_1$ of a flexural bar is dependent upon the thickness $t$ and length $L$ of the bar, and Young's modulus $Y_0$ and the density $\rho$ for the material of which the bar is made. The lowest resonant frequency is given by the formula:

$$f_1=1.02\frac{t}{L^2}\sqrt{\frac{Y_0}{\rho}}$$

The ratio of higher resonant frequencies to the fundamental is given in a formula which will be given subsequently. By varying these physical dimensions of the flexural bar or the material of which it is made, the desired lowest resonant frequency can be obtained. In accordance with the expression for the single resonant frequency of the torsional resonator 25 given previously, the resonant frequency can be chosen by selecting the effective spring constant K of the spring bar 27, and the moment of inertia I of the mass sections 33 and 35. The effective spring constant K can be selected by properly choosing the length, width, and thickness of the spring bar 27. The area and thickness of the mass sections 33 and 35 can be selected to give the desired moment of inertia I, and it is seen that it is not essential that they have a rectangular shape or that they be directly opposite one another. Thus, by changing the physical dimensions of the members 11 and 25, the single resonant frequency of the resonator can be changed. It can also be changed by making the resonator of different materials.

Figure 4:
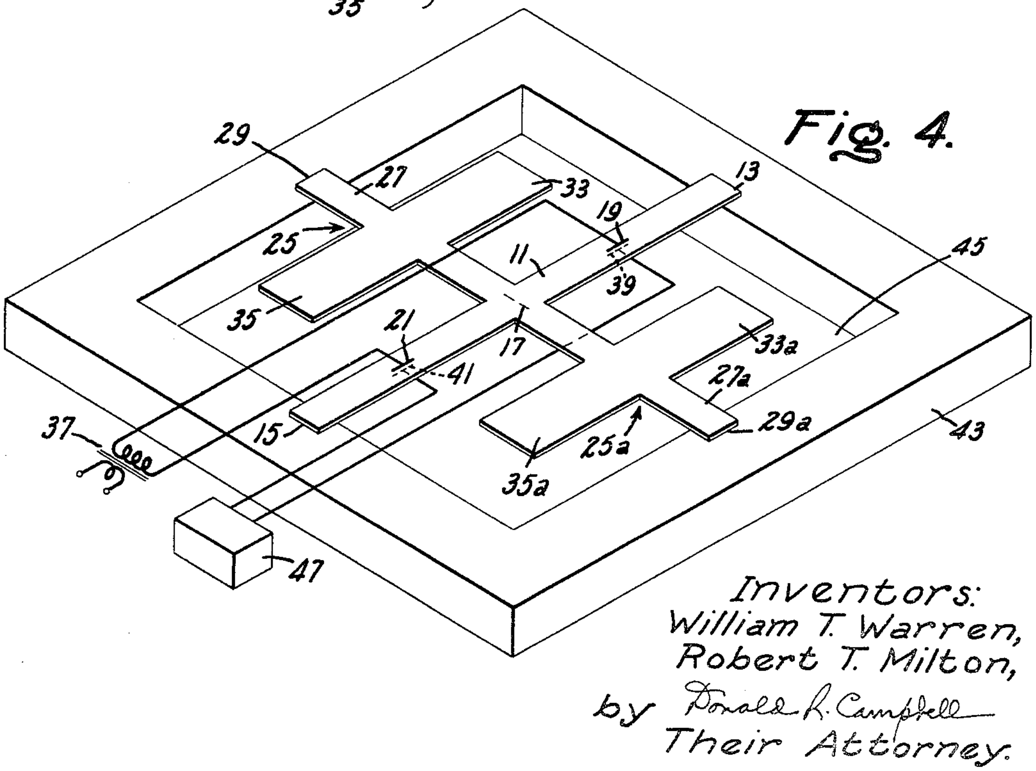
FIG. 4 is a perspective view of a modification of the resonator of FIG. 3 which employs two torsional resonator sections, one on either side of the flexural drive bar, and further showing the entire resonator mounted on an integrated circuit substrate.

While it is desirable to drive the flexural bar 11 in an even mode and to attach the spring bar 27 of the torsional resonator 25 to the node at the center of the flexural bar 11, it is possible within the broad sense of the invention to attach the torsional resonator 25 to any node at a substantially fixed point along the length of the bar 11 other than the center, whether produced by operating the bar in an odd mode, such as the mode $m=3$, or an even mode greater than the mode $m=2$. A nonsymmetrical resonator of this type, however, produces less desirable results because the off-center forces produced by the torsional resonator may modify the vibration of the flexural bar 11. The resonator shown in FIG. 4 is a variation of the resonator shown in FIG. 3 in that there are two identical or mirror image torsional resonators 25 and 25*a* attached orthogonally to either side of the flexural bar 11 at the central node 17. By attaching two torsional resonators to either side of the flexural bar 11 at the center of the bar, the forces on the driving bar are balanced. For this reason, the two torsional section resonator shown in FIG. 4 is preferable as compared to the one torsional section resonator of FIG. 3.

FIG. 4 also illustrates that the resonator according to the invention is capable of miniaturization and is suitable to be fabricated by integrated circuit technology. The physical configuration of the resonator is simple and is planar, and can be readily fabricated by depositing a metal or a semi-metal onto a silicon chip or other integrated circuit substrate 43. In this manner the members 11, 25, and 25*a* are formed integrally with one another. An interior opening or cavity 45 is then removed beneath the body of the resonator, as for instance by etching out a rectangular portion of the silicon chip 43. The maximum dimensions of opening 45, however, are made slightly less than the maximum length and width dimensions of the two torsional section resonator to leave the main body of the resonator free for vibratory motion while the ends 13 and 15 of the flexural bar 11 and the oppositely extending ends 29 and 29*a* of the spring bars 27 and 27*a* of the torsional sections overlap onto the remaining peripheral portion of the silicon chip 43 and are secured thereto to thereby clamp these ends. Since in fabricating the resonator, it is preferably deposited onto the surface of the silicon chip 43, the adherence of the ends of the flexural bar and of the spring bars of the torsional sections is sufficient to provide a clamping means and an additional clamping device is not needed. Alternatively, the overlapping ends of the resonator can be supported on columns extending up from the flat surface of the silicon chip. The invention is not intended to be limited to these methods of fabrication, and other more suitable techniques of manufacturing the resonator may be devised.

By making slight changes in the mask used to deposit the metal or semi-metal, such as silicon, of which the resonator is made, the single resonant frequency of the two torsional section resonator can be easily varied to meet different requirements. The thickness of the substance deposited to make the planar flexural and resonant members can also be readily varied to change or adjust the resonant frequency. Moreover, the input electromechanical transducers 19 and 21 for driving the flexural bar 11 can be fabricated by integrated circuit technology. The output transducers 39 and 41 are shown applied to the bottom surface of the flexural bar 11. These sense the resultant motion of the flexural bar and attached pair of torsional resonators and derive an output signal indicative thereof which is applied to a detecting circuit 47. The A-C transformer 37 for driving the input transducers 19 and 21, and the detecting circuit 47 connected to the output transducers 39 and 41, together with their connections, are illustrated in this view in diagrammatic form. The symmetrical two torsional section resonator of FIG. 4 as well as the one torsional section resonator of FIG. 3, are both responsive at a single resonant frequency and can be employed as electrical filters or for oscillator type functions.

Figure 5:
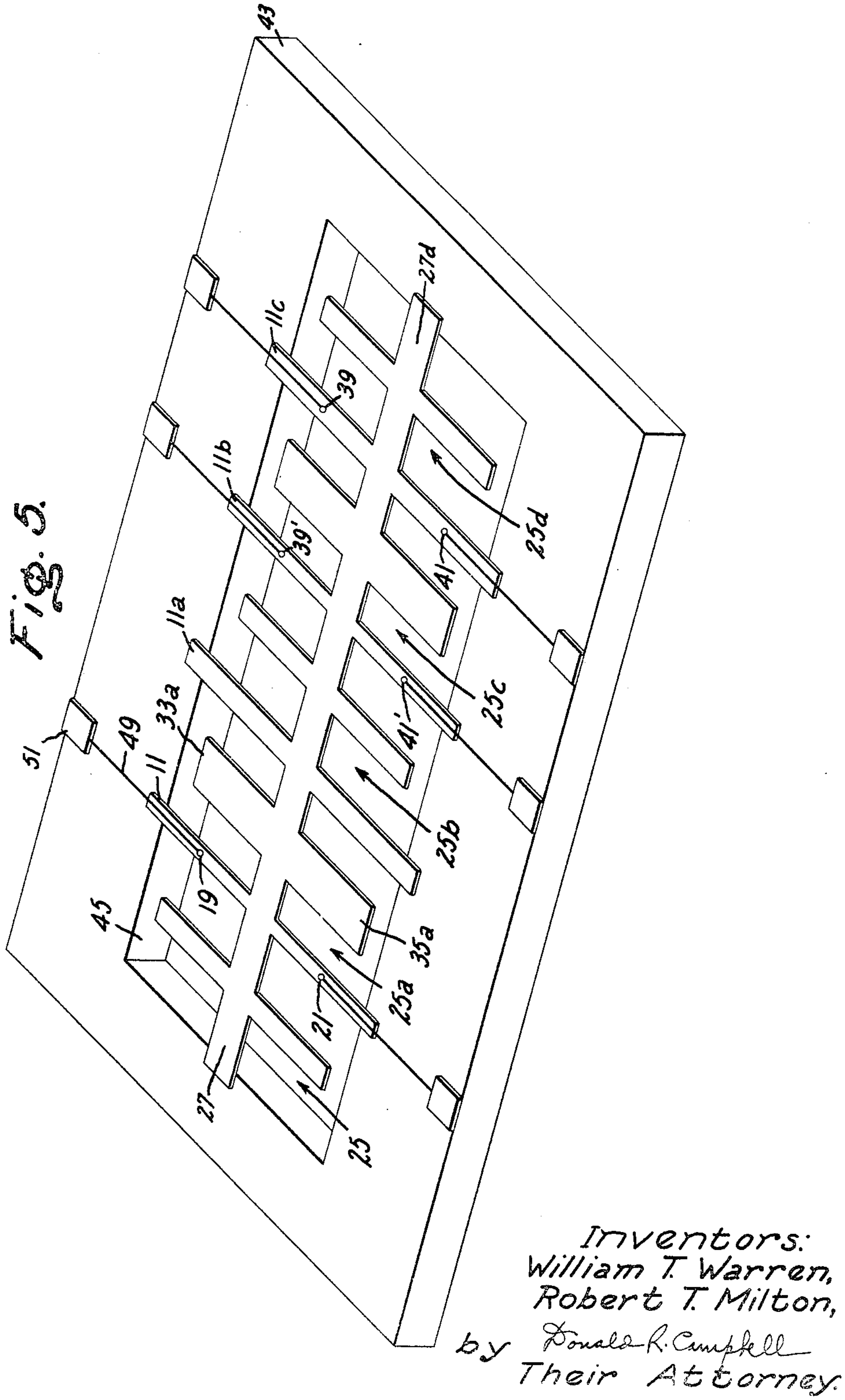
FIG. 5 is a perspective view similar to FIG. 4 but employs additional resonator sections illustrating the varying of the pass band characteristics of the resonator when used as a filter.

Referring to FIG. 5, a multi-sectioned resonator such as is illustrated here is more adaptable as an electrical filter having desired pass band characteristics, or as a delay line for providing a selected amount of delay for the propagation of signals between the input transducers and the output transducers. As before, the resonator is mounted on a silicon chip 43 having an interior opening 45 whereby the ends of the flexural bars 11 and the oppositely extending ends of the spring bars of the two endmost torsional resonators are clamped while the remaining portions of the resonator are free for vibratory motion. The multi-sectioned resonator comprises alternating cross-shaped torsional resonators and flexural bars, there being usually one less flexural bar than there are torsional resonators. The torsional resonators are identified by the numerals 25 to 25*d*, while the flexural bars are identified by the numerals 11 to 11*c*. Corresponding parts in the resonant members are identified by the same numeral having the appropriate suffix. With the exception of the extreme ends of the spring bars 27 and 27*d*, the spring bars are attached orthogonal to each adjacent flexural bar at its central node to transmit the torsional motion in serial fashion. The several torsional resonators may be identical to one another, or when used as a filter may be varied to change the pass band characteristics of the filter. For instance, the mass sections 33*a* and 35*a* of the torsional section 25*a* and the corresponding mass sections of the torsional section 25*c* may be slightly larger than those of the mass sections 25, 25*b*, and 25*d* in order to change the torsional resonant frequency. The input transducers 19 and 21 are applied to the first of the flexural bars 11, which serves as a driving bar. The output transducers 39 and 41 appear on the endmost flexural bar 11*c*, and if desired a pair of intermediate output transducers 39' and 41' may be attached to the adjacent flexural coupling bar 11*b*. The other bar 11*a* serves only as a coupling bar between the torsional sections 25*a* and 25*b*. The amount of coupling provided by the flexural bars 11*a* and 11*b*, or of the driving bar 11 or the output bar 11*c*, can be varied by changing a physical dimension such as the width of one or more of the bars. As illustrated bars 11*a* and 11*c* are wider than the other bars. In this manner the pass band characteristics of the multi-sectioned filter can be selected during manufacture, and it will be observed that the pass band characteristics at the intermediate output transducers 39' and 41' can be different from the pass band characteristics at the endmost output transducers 39 and 41, since the transducers sense the motion of the resonator at the particular bar on which they are mounted.

Because of the planar shape of the resonator shown in FIG. 5 and the fact that the central portions of the resonator are supported at regular intervals by the clamped ends of the flexural bars 11 to 11*c*, this multi-sectioned resonator can be made with as many sections as are needed. As has been demonstrated, the physical characteristics of the various torsional sections and flexural bars can be varied to build in the desired pass band characteristics. A further adaptation of this design to integrated circuit technology is shown in FIG. 5 wherein the ohmic connection leads 49 to the transducers are fabricated by deposition onto the tops of the appropriate flexural bars, each such lead 49 being connected to a terminal pad 51 at the edge of the silicon substrate 43.

A different embodiment of a single frequency clamped bar resonator suitable for fabrication by integrated circuit techniques is shown in FIG. 6. This resonator comprises two planar flexural bars 53 and 55 which are operated in different modes each at the same resonant frequency. The two bars 53 and 55 are mounted parallel and coplanar with respect to one another, and are coupled together at a node or antinode by a mechanical coupling bar 57. An input electromechanical transducer 59, such as a piezoelectric transducer, is attached to the clamped bar 53 at one of its loops or antinodes, and an output transducer 61 is attached to the clamped bar 55 also at one of its antinodes. Although a wide choice of different modes can be coupled, the clamped bar 53 as here shown is operated in the mode $m=2$, while the other clamped bar 55 is operated in the mode $m=3$. Vertical bars 62*a* and 62*b* acting as mode suppressors are placed at the nodes of the clamped bar 55 to assure that the displacement is zero for undesired modes. When the input transducer 59 is driven with an input signal having approximately the same frequency as the resonant frequency of the resonator, an appreciable output signal is derived at the output transducer 61.

The manner in which the two clamped flexural bars 53 and 55 are chosen can be better understood by referring to the graphs of amplitude of the output signal versus frequency for the respective bars 53 and 55 drawn in FIGS. 7*a* and 7*b*, wherein the series of vertical lines appear at the resonant frequencies. A clamped bar has modal resonant frequencies that are very closely approximated by the formula:

$$\frac{f_m}{f_1}=\left[\frac{2m+1}{3}\right]^2$$

where $m$ is the mode number 1, 2, 3, etc. for the resonant frequency $f_m$, and $f_1$ is the lowest resonant frequency. From this formula it is seen that the modes are not harmonically related. Referring to FIGS. 7*a* and 7*b*, and assuming the case where the clamped bar 53 is operated in the mode $m=2$ and the clamped bar 55 is operated in the mode $m=3$, the two bars are chosen such that the resonant frequency $f_2$ for the bar 53 is equal to the resonant frequency $f_3'$ for the bar 55. The bar 57 couples the flexural bars 53 and 55 so that the resultant amplitude of the output signal is large only at the common resonant frequency. Many of the other resonant frequencies $f_1$, $f_3$, etc., for the bar 53 and the other resonant frequencies $f_1'$, $f_2'$, $f_4'$, etc., for the bar 55 are discriminated against because they do not occur at the same frequency. As the mode number increases, however, the resonant frequencies for the bars 53 and 55 are more closely spaced together and may correspond at the higher mode numbers to produce an undesired mode. Thus, the two parallel clamped bar resonator of FIG. 6 is not as desirable as the torsional resonators driven by clamped flexural bars operated in an even mode and attached to the node at the center of the bar as shown in FIGS. 3 and 4.

The amount of coupling between the two clamped bars 53 and 55 of FIG. 6 may be varied by changing the width *w* of the coupling bar 57. This system will give both the over-coupled and under-coupled resonant curves by varying the width *w* of the coupling bar 57 to change the amount of coupling between the resonant bars. FIG. 8 illustrates electrical coupling between the two clamped bars 53 and 55. An input electromechanical transducer 59 is attached to one loop and the coupling transducer 63 is attached to the other loop or antinode of the clamped bar 53, and a corresponding coupling transducer 65 is applied to an antinode of the other clamped bar 55. The output transducer 61 is shown here at the opposite end of the bar 55. Another system (not shown) using clamped bars operated in different modes has an amplifier between the two coupling transducers 63 and 65. The coupling between the two bars in this case is not mutual, but a double-peaked resonance may be obtained by stagger tuning the two resonators.

Although not restricted to use in integrated circuits, the electrochemical resonators here described are planar and have a relatively simple mechanical configuration which is readily adapted to be fabricated by integrated circuit technology. The resonators are capable of miniaturization to a size in the range of about 400 mils to 30 mils, and can be employed either in hybrid or monolithic integrated circuits. The physical configuration of the resonators, particularly those shown in FIGS. 1–5, are such that the resonant frequency of the resonator can be selected during manufacture by varying the physical dimensions or material of the resonant members which comprise a complete resonator. Furthermore, the multi-sectioned resonator of FIG. 5 can be fabricated with different pass band characteristics by selecting during manufacture the torsional frequency of the torsional sections, and the amount of coupling provided by the interconnecting flexural bars. The resonators can be economically mass produced due to these several advantages.

While the invention has been particularly shown and described with reference to several preferred embodiments thereof, it will be understood by those skilled in the art that various changes in form and details may be made therein without departing from the spirit and scope of the invention.

What we claim as new and desire to secure by Letters Patent of the United States is:

1. A planar electromechanical resonator suitable to be fabricated by integrated circuit technology comprising
- an integrated circuit support,
- a planar flexural bar clamped at each end to said support and operated in even flexural mode so as to have a node at the center of the bar,
- a pair of planar torsional resonators each having a single resonant frequency and each comprising a spring bar having a pair of mass sections which extend transverse to the spring bar from opposite sides thereof,
- said flexural bar and torsional resonators being mounted in a common plane in a symmetrical pattern with one end of each of the spring bars attached to the flexural bar on opposite sides thereof at the central node to be torsionally driven thereby, the other ends of the spring bars being clamped to said support,
- input transducer means mounted on said flexural bar for driving the flexural bar to have vibratory motion, and
- output transducer means mounted on said flexural bar for sensing the resultant motion of said resonator and deriving an output signal indicative thereof.

2. A construction as defined in claim 1 wherein said pair of torsional resonators are substantially identical and have the same resonant frequency, and wherein
- said flexural bar and torsional resonators have a one-piece construction and the spring bars extend substantially orthogonal to the flexural bar at the central node.

3. A planar electromechanical resonator suitable to be fabricated by integrated circuit technology comprising
- a planar flexural bar clamped at each end and operated in even mode so as to have a node at the center of the bar,
- a pair of planar torsional resonators each having a single resonant frequency and each comprising a spring bar having a pair of mass sections which extend transverse to the spring bar from opposite sides thereof,
- said flexural bar and torsional resonators being mounted in a common plane in a symmetrical pattern with one end of each of the spring bars attached to the flexural bar on opposite sides thereof at the central node to be torsionally driven thereby, the other ends of the spring bars being clamped,
- input transducer means for driving the flexural bar to have resonant vibratory motion, and
- output transducer means for sensing the resultant motion of said resonator and deriving an output signal indicative thereof, further including
- an integrated circuit substrate having an interior opening, the flexural bar and attached torsional resonators on either side thereof being mounted within the opening with the ends of the flexural bar and the oppositely extending ends of the spring bars overlapping and secured to portions of the substrate to be clamped thereby.

4. A planar electromechanical resonator suitable to be fabricated by integrated circuit technology comprising
- a planar flexural bar clamped at each end and operated in even mode so as to have a node at the center of the bar,
- a pair of planar torsional resonators each having a single resonant frequency and each comprising a spring bar having a pair of mass sections which extend transverse to the spring bar from opposite sides thereof,
- said flexural bar and torsional resonators being mounted in a common plane in a symmetrical pattern with one end of each of the spring bars attached to the flexural bar on opposite sides thereof at the central node to be torsionally driven thereby, the other ends of the spring bars being clamped,
- input transducer means for driving the flexural bar to have resonant vibratory motion, and
- output transducer means for sensing the resultant motion of said resonator and deriving an output signal indicative thereof, further including
- an integrated circuit substrate,
- said flexural bar and torsional resonators being formed integrally by depositing metal or semi-metal onto the surface of said substrate, an interior opening portion of said substrate then being removed to leave the complete resonator mounted within the interior opening to be free for vibratory motion with the exception that the ends of the flexural bar and the oppositely extending ends of the spring bars overlap and are adhered to the surface of the substrate to be clamped thereby.

5. A planar multi-sectioned resonator suitable to be fabricated by integrated circuit technology comprising
- a plurality of planar flexural bars each clamped at each end and operated in even mode so as to have a node at the center of the bar,
- a plurality of planar torsional resonator sections each having a single resonant frequency and each comprising a spring bar having a pair of mass sections which extend transverse to the spring bar from opposite sides thereof, said flexural bars and torsional sections being mounted alternately in a common plane with a respective end of each of the spring bars attached approximately orthogonal to each adjacent flexural bar at its central node to transmit the torsional motion, there being torsional sections at either end of the resonator, the oppositely extending ends of the spring bars of the endmost torsional sections being clamped, input transducer means coupled to a first one of said flexural bars for driving the said first flexural bar to have vibratory motion, and output transducer means coupled to a second one of said flexural bars for sensing the motion of said resonator at said second flexural bar and deriving an output signal indicative thereof.

6. A construction as defined in claim 5 wherein the multi-sectioned resonator is employed as a filter having desired pass band characteristics, the desired pass band characteristic being obtained by varying a physical dimension of one or more of the torsional sections to change its single resonant frequency and/or varying a physical dimension of one or more of the flexural bars to change the amount of coupling provided thereby.

7. A construction as defined in claim 5 further including an integrated circuit substrate having an interior opening, the multi-sectioned resonator being mounted within the opening to be free for vibratory motion with the exception that the ends of the flexural bars and the oppositely extending ends of the spring bars of the endmost torsional sections overlap and are secured to portions of the substrate to be clamped thereby.

8. A construction as defined in claim 1 wherein said input and output transducer means are electromechanical transducers, and wherein a pair of said input and output transducers are attached to the flexural bar at antinodes thereof on each side of the central node, and means for driving said pair of input transducers out of phase.

9. A planar electromechanical resonator suitable to be fabricated by integrated circuit technology comprising an integrated circuit substrate, a planar flexural bar clamped at each end to said integrated circuit substrate and operated in even flexural mode so as to have at least one node at a substantially fixed point along its length, at least one planar torsional resonator operated in torsional mode at a single resonant frequency and comprising a spring bar and a pair of mass sections which extend transverse to the spring bar from opposite sides thereof, one end of said spring bar being clamped to said integrated circuit substrate while the other end is attached to said flexural bar at the aforementioned fixed node point to be torsionally driven thereby, said flexural bar and torsional resonator being coplanar and a one-piece construction, input transducer means mounted on said flexural bar for driving the flexural bar to have vibratory motion, and output transducer means mounted on said flexural bar for sensing the resultant motion of said resonator and deriving an output signal indicative thereof.

10. A construction as defined in claim 9 wherein the fixed node point is located approximately at the center of said flexural bar, and wherein said input and output transducer means each comprises a pair of electromechanical transducers respectively located at an antinode of said flexural bar on either side of the centrally located node point, and further including means for driving the input pair of electromechanical transducers out of phase.

References Cited

UNITED STATES PATENTS

| | | | |
|---|---|---|---|
| 3,064,213 | 11/1962 | Mason | 333—71 |
| 3,015,789 | 2/1962 | Honda | 333—72 |
| 3,013,228 | 12/1961 | Kottel | 333—71 |
| 3,389,351 | 6/1968 | Trzeba | 333—71 |

HERMAN KARL SAALBACH, Primary Examiner

C. BARAFF, Assistant Examiner